United States Patent Office 3,725,275
Patented Apr. 3, 1973

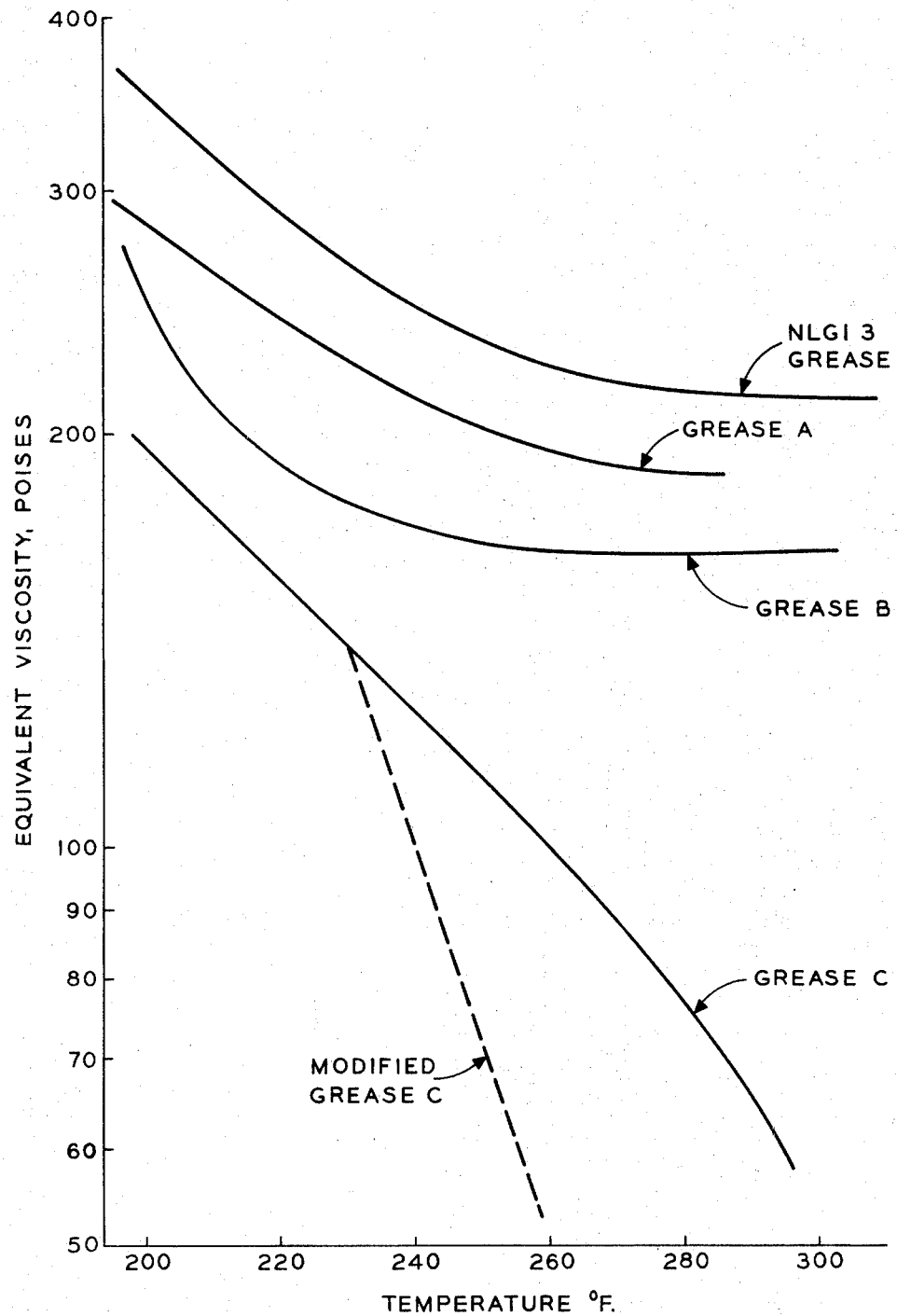

3,725,275
COMPLEX ALUMINUM GREASES HAVING RELATIVELY CONSTANT CONSISTENCY AT ELEVATED TEMPERATURES
Crawford F. Carter, Concord, and John L. Dreher, Berkeley, Calif., assignors to Chevron Research Company, San Francisco, Calif.
Filed Aug. 29, 1969, Ser. No. 854,199
Int. Cl. C10m 5/26
U.S. Cl. 252—21    6 Claims

ABSTRACT OF THE DISCLOSURE

A grease comprising a major amount of mineral oil and minor amounts of (1) a complex aluminum soap (2) an alkali metal salt of a monocyclic aromatic carboxylic acid, and (3) a member selected from silica or ammonium-treated clay.

BACKGROUND OF THE INVENTION

Field of the Invention

This invention concerns novel improved grease compositions having as the principal thickener aluminum carboxylate salts. More particularly, this invention concerns novel grease compositions thickened by a combination of aluminum carboxylate salts and silica or an alkyl ammonium salt-treated bentonite clay, and stabilized by alkali metal aroates.

In modern food processing plants, much of the preparing and packaging of the food is done by high-speed, high-temperature machinery. The various food processing machines present several types of lubrication problems. Two problems in particular, however, are found to be generally common to all types of food processing machines. First, while the machines are operating, a machine lubricant may come in contact with the food being processed. This possibility exists even though such contact, termed "incidental food contact," is not desired. In most cases where such incidental food contact occurs, a small portion of the lubricant thereafter may remain with the food. Second, at numerous points on any operating machine, local high temperatures occur.

Other specialized lubrication problems occur with specific types of food processing machines. For example, cutting and dicing machines face severe rusting threats, because the produce being processed by the machine is usually wet from water washing and, in addition, some vegetables and many fruits contain a considerable amount of water and acids which are released when the fruit or vegetable is cut. A similar rusting problem occurs with peeling and paring machines. Further, the machinery is frequently cleaned with high pressure hot water and detergents which wash away the lubricants.

Thus, a lubricant designed for use in food processing machinery is subject to severe restrictions. First, since some may come in contact with the food, it must be safe for human consumption. The standards to be met are set forth in various sections of the Food and Drug Administration Regulations, particularly Section 121.2553 of Title 21, Part I of the Code of Federal Regulations: "Lubricants with Incidental Food Contact." Second the lubricant must retain its grease characteristics for a substantial period of time at high temperatures. This means that over the operating temperature range of the food machinery the grease must substantially retain its consistency and lubricating properties. Third, the lubricant should act as a rust preventative.

DESCRIPTION OF THE PRIOR ART

Complex aluminum carboxylate greases are well known in the art. They are described in the text, "Manufacture and Application of Lubricating Greases" by C. J. Boner (Reinhold, 1954). Aluminum complex thickeners and greases employing them are described in numerous patents, among which are U. S. Pats. 2,599,553, 2,654,710, 2,719,826 and 2,768,138. The use of treated bentonite clay as a grease thickener is described in the Boner text and in U.S. Pat. 2,531,440. The use of silica is also described in the Boner text.

SUMMARY

The composition of this invention is a grease, particularly for use with food machinery having a relatively constant consistency at elevated temperatures, comprising a major portion of a mineral lubricating oil and also containing effective amounts of (1) a complex aluminum di-salt of an aromatic carboxylic acid and an aliphatic carboxylic acid, (2) an alkali metal salt of a monocyclic aromatic carboxylic acid, and (3) silica or an alkyl ammonium salt-treated bentonite clay.

DESCRIPTION OF THE DRAWING

The figure is a graph illustrating the stability characteristics of greases of this invention over the normal operating temperature range of common food machinery.

DETAILED DESCRIPTION OF THE INVENTION

In its broadest form, the composition of this invention is a grease having stable high-temperature consistency, comprising a major portion of a mineral lubricating oil and also containing effective amounts of (1) a complex aluminum di-salt of an aromatic carboxylic acid and an aliphatic carboxylic acid, (2) an alkali metal salt of a monocyclic aromatic carboyxlic acid, and (3) silica or an alkyl ammonium salt-treated bentonite clay. Preferred embodiments of this composition will be described below.

The basic complex aluminum carboxylate di-salt, or "di-soap," may be described by the general formula:

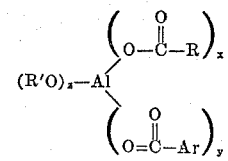

in which R is an aliphatic group having 8 to about 30 carbon atoms, Ar is an aromatic radical, preferably a monocyclic hydrocarbon radical, R' is either hydrogen or a lower aliphatic hydrocarbon radical with at least one-half of R' being hydrogen, $x$ is at least 0.25, $y$ is at least 0.25, the sum of $x$ and $y$ is from 1.5 to 2.5, and $z$ is from 0.5 to 1.5. The aluminum is trivalent in the above formula and the sum of $x$, $y$, and $z$ is therefore 3. However, this formula is not intended to indicate the actual structure of the aluminum di-soap in the grease, but rather indicates the stoichiometry between the aluminum cation and the anions.

The basic definition of these complex aluminum di-soaps is given in U.S. Pat. 2,599,553, to B. W. Hotten. In this patent the aluminum soap thickeners are described as having "at least 2 dissimilar substantially hydrocarbonaceous organo anions having certain characterietics. The organo anions are generally oleophilic; however, one of the organo anions of the complex soap molecule has a greater oil solubility than the other organo anion of the same soap molecule. The aluminum di-soaps of the more soluble organo-anions (i.e., the relatively oleophilic anions) are soluble in an amount of at least 5 percent (by volume) at 400° F. in petroleum white oil having viscosity characteristics of 346 SSU at 100° F. and 54 SSU at 210° F. and having a viscosity index of 92. That is, at 400° F., 5 percent of the aluminum soap of the oleophilic organo anion will form a true solution in the petroleum white oil. The aluminum soaps of the less soluble organo anions (i.e., the relatively oleophobic anions) are soluble in the above white oil in an amount of less than 1 percent at 400° F. That is, at 400° F. less than 1 percent (from 0 percent to about 1 percent) [by volume] of the aluminum soap containing the oleophobic anions will dissolve in the white oil to form a true solution."

Under this definition,

represents the relatively oleophilic anion and

represents the relatively oleophobic anion.

The aliphatic carboxylic acids from which the oleophilic anions are derived are illustrated by caprylic acid, capric acid, lauric acid, myristic acid, palmitic acid, stearic acid, 12-hylinoleic acid, etc. The preferred aliphatic carboxylic acids have from 14 to 22 carbon atoms, more usually from 16 to 18 carbon atoms.

The relatively oleophobic anions are substantially hydrocarbonaceous in structure, contain from about 7 to 12 carbon atoms, and have an aromatic hydrocarbon ring (benzene). Illustrative of the aromatic carboxylic acids from such anions are derived are benzoic acid, toluic acid, ethylbenzoic acid, phenylacetic acid, phenylpropionic acid, salicylic acid, etc. The preferred acids are those of from 7 to 9 carbon atoms having the carboxyl group bonded to the benzene ring, e.g., benzoic acid, toluic acid, dimethylbenzoic acid, and ethylbenzoic acid.

Illustrative of R' are alkyl groups of from 1 to 6 carbon atoms, including methyl, ethyl, propyl, isopropyl, butyl, pentyl, and hexyl, and isomers and mixtures thereof. These derive from the aluminum alcoholate which is reacted with the two organo acids to form the di-soap, which reaction is described in aforesaid U.S. Patent 2,599,553.

The complex aluminum carboxylate di-soap may be present in amounts up to 40 weight percent of the total grease composition. Preferably it is present as about 2–25 weight percent, and more preferably as about 5–15 weight percent.

The second component of the composition of this invention is an alkali metal salt of a monocyclic aromatic carboxylic acid, hereinafter often referred to as an alkali metal aroate. The presence of this component reduces the tendency of the grease composition to liquefy in a bearing after an extended period of time under working conditions at high temperatures. Suitable alkali metals are lithium, sodium, and potassium, with sodium preferred. The aroate has 7 to 12 carbon atoms and is preferably the salt of benzoic acid. The alkali metal aroate is present as from about 0.1 to 10 weight percent, preferably 1 to 5 weight percent, in the grease composition. It may be added during the preparation of the grease, or as a final step after all the other components have been incorporated into the grease.

The third component of the grease composition is silica or an alkyl ammonium salt-treated bentonite clay. The silica is usually provided in the form of a finely divided free-flowing aerogel of submicron particle size and low apparent density. Silica in this form, however, is quite susceptible to water and therefore it is common to coat the particles of silica to render them water repellent. Typical materials used as coating include trichloromethyl siloxane, polybutadiene, polystyrene, and aminosilanes. A particularly water-repellent silica is produced by heating sodium hydroxide, silica alcogel, and a mixture of glycerol dichlorohydrin and tetraethylene pentamine. It is also possible to overcome the water susceptibility of silica by incorporating certain additives into the grease. Such additives are generally hydrophobic cationic surface-active agents.

As a preferred alternative to silica, in the grease of this invention, bentonite may be used. Bentonite is a colloidal clay containing appreciable amounts of the mineral montmorillonite, which is a hydrous aluminum silicate having an expending latice. As used in the composition of this invention, the platelets of montmorillonite in the bentonite clay are coated with a quaternary alkyl ammonium salt. The alkyl ammonium salt generally contains 10 to 40 carbon atoms per molecule. When dispersed in the grease composition of this invention, the bentonite is present in the form of plate-like structures with an ultimate particle size of approximately 1 micron in maximum dimension and approximately 0.003 micron in minimum dimension. Particularly preferred bentonites for use in the composition of this invention are those commercially available under the trademark "Bentone" from the National Lead Company. Preferred among these is "Bentone 34" which is described in the literature as dimethyldioctadecyl ammonium bentonite.

Another group of satisfactory bentonites are those available commercially from the same source under the trademark "Baragel." These materials are the reaction products of mixed organic ammonium halides and refined sodium montmorillonite. They may also contain organic antioxidants to provide a measure of oxidation inhibiting ability.

The silica or bentonite will be present as 0.5–15 weight percent of the grease composition. Preferably, it will be present as 1–10 weight percent, and more preferably as 1–5 weight percent. It is generally found that higher NLGI (National Lubricating Grease Institute) grade greases should contain larger amounts of silica or bentonite. The ratio of silica or bentonite to aluminum di-soap should be in the range of 1 to 4 parts by weight of aluminum di-soap to 1 part by weight of silica or bentonite.

The mineral lubricating oil base, which is thickened into the grease of this invention, is generally a white oil. This is a colorless, transparent oily hydrocarbonaceous liquid, almost tasteless and odorless even when warm, with a specific gravity of about 0.83 to 0.91. It is soluble in such oragnic compounds as ether, chloroform, benzene, and boiling alcohol, but insoluble in water and cold alcohol. It is usually obtained by the distillation of high-boiling petroleum fractions. Numerous white oils are described in the literature. When the grease composition of this invention is used in its preferred embodiment as a food machinery grease, the white oil is of a technical grade which meets the Food and Drug Administration requirements referred to above.

The mineral lubricating oil base is present as the major portion of the composition of this invention. Preferably, it comprises at least 65 weight percent of the total composition, and more preferably, at least 75 weight percent. It will not, however, comprise more than 95 weight percent of the total composition. The higher NLGI grades of greases will usually contain the smaller amounts lubricating oil base.

Various additives may be incorporated into the grease composition of this invention, subject only to the requirement that they are not antagonistic to the required components of the invention. Typical additives which may be incorporated include rust preventatives, fillers and stringiness agents. Where the grease of this invention is to be used in its principal application, as a food machinery grease, the various materials which are to be used as additives must also be approved by the Food and Drug Administration for incidental contact with food. Each of these additives will be present in an amount less than 3 weight percent of the finished grease composition.

The greases described in the following examples all contained, in addition to the components mentioned, small amounts (less than 3 parts by weight each) of conventional rust and oxidation inhibitors. In the following examples, all composition quantities are reported as parts by weight.

EXAMPLE 1

A grease was formulated by thickening 85.75 parts of technical grade white oil, having a viscosity at 100° F. of 440–475 SUS, an ASTM D–156 Saybolt color maximum of 20, and meeting the appropriate FDA requirements. The aluminum di-soap was prepared by reacting in situ 3.50 parts of stearic acid, 1.48 parts of benzoic acid and 2.48 parts of aluminum isopropoxide. This in situ reaction is of the type described in U.S. Pat. 3,345,291. Also present were 1.40 parts of sodium benzoate and bentonite in the form of 2.80 parts of "Bentone 34." This grease was of NLGI Grade 0 and had an undisturbed penetration of 320 in the ASTM D–217 test. Its ASTM D–566 dropping point was 430° F., and it passed a modified ASTM D–1743 rust test in which the rust test sample was subjected to 125° F. for one day.

EXAMPLE 2

A grease was formulated by thickening 83.11 parts of the white oil described in Example 1 with the reaction product of 4.00 parts of stearic acid, 1.69 parts of benzoic acid and 2.82 parts of aluminum isopropoxide. Also present were 1.80 parts of sodium benzoate and 3.40 parts of "Bentone 34." This grease was of NLGI Grade 1 and had an undisturbed ASTM D–217 penetration of 280. Its ASTM D–566 dropping point was 460° F., and it passed the modified ASTM D–1743 rust test described above.

EXAMPLE 3

A grease was formulated by thickening 80.75 parts of the above-described white oil with 4.50 parts of stearic acid, 1.90 parts of benzoic acid, and 3.18 parts of aluminum isopropoxide. Also present were 2.00 parts of sodium benzoate and 4.00 parts of "Bentone 34." This grease was of NLGI Grade 2 and had an undisturbed ASTM D–217 penetration of 255. Its ASTM D–566 dropping point was 470° F. and it passed the above-described modified ASTM D–1743 rust test.

EXAMPLE 4

A grease was formulated by thickening 82.95 parts of technical grade white oil, having a viscosity at 100° F. of 345 to 355 SUS, an ASTM D–156 Saybolt color maximum of 30, and meeting the appropriate FDA requirements. The thickener was the reaction product of 3.18 parts of aluminum isopropoxide, 4.50 parts of stearic acid and 1.90 parts of benzoic acid. Also present were 4.70 parts of sodium benzoate and 4.0 parts of bentonite in the form of "Baragel-24."

The figure illustrates the high temperature stability characteristics of the grease of this invention. The temperature range shown is the common operating temperature range of food machinery. Greases A, B and C (and modified Grease C) are all NLGI Grade 2 greases. For comparison purposes, an NLGI Grade 3 having a composition similar to that of Grease C is shown. Greases A and B are the greases described in Examples 3 and 4, respectively, above. Grease C has a composition similar to that of Grease B but with the exception that Grease C contains no bentonite. Modified Grease C has a composition similar to Grease C but with the exception that it contains, in addition to the other components, 1.5 parts of polyethylene. Each of these greases also contains a small amount (less than 1 part) of a stringiness agent.

It is evident from the curve shown on the figure that the two greases of this invention, Grease A and Grease B, have excellent stability characteristics at the temperature encountered in typical food machinery. As will be shown below, this enables these greases to be retained far longer on the machinery and thus to serve their lubricating purpose better than prior art greases. The data shown also indicate that the Grade 2 greases are the equivalent in stability of the harder Grade 3 prior art greases. Thus, the Grade 2 greases of this invention may be used where heretofore only the harder and less easily applied Grade 3 greases of the prior art were required.

The data in the table below illustrate the ability of the greases of this invention to be retained on the food machinery during severe service. In each of the experiments which provided the data in the table, the grease was applied to the lubrication points in a canning machine. The machine was then run off line with a speed equivalent to 120 cans per minute but without the cans actually being present. The steam pressure was 18 to 20 pounds and the machine was run at 4-hour relubrication intervals. The data in the table indicate the average amount of grease retained at the lubrication point at the end of a 4-hour interval. Grease D is similar to Grease B but with the exception that instead of the bentonite an equivalent amount of silica was present in the grease composition.

TABLE

| Grease | Worked penetration | Percent retention |
|---|---|---|
| NLGI 3 | 243 | 70 |
| C | 293 | 0 |
| B | 270 | 45 |
| D | 275 | 50 |

It is evident from the above data that the greases of this invention, i.e. Greases B and D, had quite good retention properties and in fact closely approximated the retention properties of the harder NLGI Grade 3 grease. The data also show that the greases of this invention are far superior to the conventional food machinery grease (Grease C) in their retention properties: half of the lubricant of this invention still remains on the food machinery at a time when the machinery lubricated with the prior art grease is running with no lubricant remaining at all.

These data and the above description show that the grease of this invention is a grease having superior stability and retention characteristics and which also may serve to prevent rust in machinery subjected to contact with significant amounts of hot water. Further, the greases of this invention may be compounded to fully meet applicable Food and Drug Administration requirements for service as food machinery greases.

We claim:

1. A grease composition having a relatively constant consistency at elevated temperatures and comprising a major portion of a mineral lubricating oil and (1) an effective amount up to 40 weight percent of the composition of a complex aluminum di-salt of an aromatic carboxylic acid and an aliphatic carboxylic acid, (2) 0.1 to 10 weight percent of the composition of an alkali metal salt of a monocyclic aromatic carboxylic acid and (3) 0.1–15 weight percent of the composition of silica or an alkyl ammonium salt-treated bentonite clay.

2. The composition defined in claim 1, wherein said mineral lubricating oil is a white oil.

3. The composition defined in claim 1, wherein said alkali metal salt of a monocyclic aromatic carboxylic acid is sodium benzoate.

4. The composition defined in claim 1, containing alkyl ammonium salt-treated bentonite clay.

5. The composition defined in claim 1, wherein the components are present in the amounts, measured as weight percent of the total composition:

| | |
|---|---|
| Complex aluminum di-salt of an aromatic carboxylic acid and an aliphatic carboxylic acid | 2–25 |
| Alkali metal salt of monocyclic aromatic carboxylic acid | 0.1–10 |
| Silica or alkyl ammonium salt-treated bentonite clay | 0.1–15 |

6. The composition defined in claim 1, wherein the components are present in the amounts, measured as weight percent of the total composition:

| | |
|---|---|
| Complex aluminum di-salt of an aromatic carboxylic acid and an aliphatic carboxylic acid | 5–15 |
| Alkali metal salt of monocyclic aromatic carboxylic acid | 1–5 |
| Silica or alkyl ammonium salt-treated bentonite clay | 1–15 |

References Cited

UNITED STATES PATENTS

| | | | |
|---|---|---|---|
| 3,511,781 | 5/1970 | Hotten | 252—36 |
| 2,768,138 | 10/1956 | Hotten et al. | 252—37.7 |
| 3,620,975 | 11/1971 | Polishuk | 252—21 |

FOREIGN PATENTS

| | | | |
|---|---|---|---|
| 606,740 | 10/1960 | Canada | 252—21 |

DANIEL E. WYMAN, Primary Examiner

I. VAUGHN, Assistant Examiner

U.S. Cl. X.R.

252—28